United States Patent
Pallini et al.

(10) Patent No.: US 8,440,034 B2
(45) Date of Patent: May 14, 2013

(54) SYSTEM, METHOD, AND APPARATUS FOR PRE-TENSIONED PIPE FOR LOAD-SHARING WITH COMPOSITE COVER

(75) Inventors: Joseph W. Pallini, Tomball, TX (US); Fife B. Ellis, Houston, TX (US); Danny L. Havelka, Houston, TX (US); Brian N. Munk, Houston, TX (US)

(73) Assignee: Vetco Gray Inc., Houston, TX (US)

( * ) Notice: Subject to any disclaimer, the term of this patent is extended or adjusted under 35 U.S.C. 154(b) by 30 days.

(21) Appl. No.: 13/036,187

(22) Filed: Feb. 28, 2011

(65) Prior Publication Data

US 2011/0139341 A1 Jun. 16, 2011

Related U.S. Application Data

(62) Division of application No. 11/895,383, filed on Aug. 24, 2007, now Pat. No. 7,896,998.

(51) Int. Cl.
*B32B 37/00* (2006.01)

(52) U.S. Cl.
USPC .............. 156/80; 156/160; 156/161; 156/169

(58) Field of Classification Search ............... 156/80, 156/169, 172, 84, 160, 161, 163, 164
See application file for complete search history.

(56) References Cited

U.S. PATENT DOCUMENTS

| | | | | |
|---|---|---|---|---|
| 3,731,367 A | * | 5/1973 | Laussermair et al. | 29/447 |
| 3,922,426 A | * | 11/1975 | Feltzin | 428/378 |
| 4,544,428 A | * | 10/1985 | Mandel | 156/161 |
| 6,149,856 A | * | 11/2000 | Zemel et al. | 264/401 |
| 2006/0096993 A1 | * | 5/2006 | Takashima | 220/588 |

FOREIGN PATENT DOCUMENTS

EP 0365298 A1 * 4/1990

* cited by examiner

*Primary Examiner* — Jeff Aftergut
(74) *Attorney, Agent, or Firm* — Bracewell & Giuliani LLP

(57) ABSTRACT

A pipe is wrapped with a composite to form a pre-stressed interface to facilitate load sharing between the materials. Prior to being wrapped, the pipe is placed in tension via hydraulic devices or the like. Alternatively, a combination of cured and uncured composite wraps is used in proximity to each other to apply compressive stress to the pipe. In addition, the pipe may be subjected to cold temperatures to change its dimensions prior to being wrapped with a composite material.

7 Claims, 5 Drawing Sheets

SYSTEM, METHOD, AND APPARATUS FOR PRE-TENSIONED PIPE FOR LOAD-SHARING WITH COMPOSITE COVER

This application is a divisional of Ser. No. 11/895,383, filed Aug. 24, 2007, U.S. Pat. No. 7,896,998, to issue Mar. 1, 2011.

BACKGROUND OF THE INVENTION

1. Technical Field

The present invention relates in general to reinforced pipes and, in particular, to an improved system, method, and apparatus for pre-tensioning riser pipes to share load with composite covers.

2. Description of the Related Art

In the prior art, the internal pressure capacity of steel alloy risers may be increased by wrapping the outer diameters (OD) of the risers with a composite material, such that the pressure capacity is shared by the steel pipe and the composite wrap. For example, in one application a pipe is wrapped with a carbon-fiber and epoxy matrix composite that is applied to the OD. The composite is strictly limited to increasing the hoop stress capacity of the pipe. In addition, a fiberglass covering can be applied over the top of both the composite and the pipe to provide damage protection.

During service, the pipe is subjected to high axial tension and bending moments, extremely high internal pressures, and environmental fatigue loads. Consequently, one manufacturing consideration is how to prevent the pipe from yielding prior to the internal pressure load being taken by the composite.

Several methods that address this issue have been suggested and include the following: (a) pre-yielding the composite-wrapped pipe by pressuring the inner diameter (ID) past the yield strength of the pipe to ensure load sharing (also known as "auto-frettage"); (b) letting the load sharing occur via deflection (with or without yielding) during normal service of the product; and (c) developing hoop stress by applying high tension to the carbon fibers during winding of the pipes (also known as "frettage"). Although these solutions are workable for some applications, improved solutions having even higher performance capabilities would be desirable.

SUMMARY OF THE INVENTION

Embodiments of a system, method, and apparatus for pre-stressing the interface between a pipe and composite wrap on the pipe are disclosed. The invention improves the load sharing between the two materials and thereby prevents yielding of the materials. In one embodiment, the pipe is put in tension prior to being circumferentially wrapped with a composite material, such as a carbon fiber-based product. After the pipe is wrapped and the pre-tension is relieved, a pre-stressed interface between the pipe and composite is achieved.

The composite wrap may be circumferentially applied from a spooling machine that is tangent to the OD of the pipe. The composite is cured for some applications to pre-stress the interface between the pipe and composite. Alternatively, axially-oriented composite fibers may be applied as well, or a combination of axial and circumferential fibers. The fibers may be wrapped in bundles or as a continuous, pre-manufactured tape.

In addition, the invention comprises various methods of applying the tension to the pipe segments. For example, one or more annular hydraulic pistons may be inserted into an interior of the pipe section prior to winding the carbon fibers. End connections are welded to the pipes and are formed (e.g., machined) with reaction features against which the ends of the piston react. The hydraulic piston applies tension to the pipe and the pipe is wound with the composite. After the composite is wound and cured, the hydraulic piston pressure is relieved. The hydraulic tensioning equipment is reusable for each pipe segment. The internally-tensioned pipe advantageously does not interfere with the external wrapping of the pipes. The pipe can be spun with a stationary fiber spool, or the fiber spool may wind around a stationary pipe.

Alternatively, the pipe may be externally tensioned with a tensioning frame having one or more hydraulic cylinders for applying force. The frame reacts against an upset end piece on the pipe, such as a feature on the welded end connections. The hydraulic cylinder reacts against the frame to supply the tension. The external system can apply more tension to the pipe than an internal system. The frame does not interfere with the winding process and has sufficient space around the frame to add the fibers to the pipe. In one embodiment, the pipe rotates with respect to the spooling machine and the tension frame, and uses high-capacity bearings between the pipe reaction shoulder and frame.

In another embodiment, a combination of cured and uncured composite wraps is used in proximity to each other. For example, a dry fiber assembly or pre-cured composite assembly is first wrapped onto the pipe under tension to apply a compressive stress to the pipe. The pipe is then rotated in the opposite direction while a wet composite is simultaneously applied to the pipe directly adjacent to the unrolling dry fiber assembly. In this way, the wet composite takes advantage of the pre-compressed condition beneath the dry composite. After the wet composite has completely replaced the dry fiber, the wet composite is allowed to cure on the compressed pipe.

In still another embodiment, the length and diameter of the pipe is reduced prior to wrapping by significantly reducing a temperature of the pipe. The cooling operation may be performed by extreme freezing in a chamber, or a continuous supply of a cold medium to the ID of the pipe (such as liquid nitrogen). The cold temperatures may reduce curability of some composite matrix materials (e.g. heat-cured epoxy). However, matrix materials other than heat-cured epoxies (e.g., UV-cured epoxies) may be used. In addition, the pipe axially expands upon re-warming, causing an axial pretension in the composite wrap.

The foregoing and other objects and advantages of the present invention will be apparent to those skilled in the art, in view of the following detailed description of the present invention, taken in conjunction with the appended claims and the accompanying drawings.

BRIEF DESCRIPTION OF THE DRAWINGS

So that the manner in which the features and advantages of the present invention, which will become apparent, are attained and can be understood in more detail, more particular description of the invention briefly summarized above may be had by reference to the embodiments thereof that are illustrated in the appended drawings which form a part of this specification. It is to be noted, however, that the drawings illustrate only some embodiments of the invention and therefore are not to be considered limiting of its scope as the invention may admit to other equally effective embodiments.

DETAILED DESCRIPTION OF THE INVENTION

Figure 1:
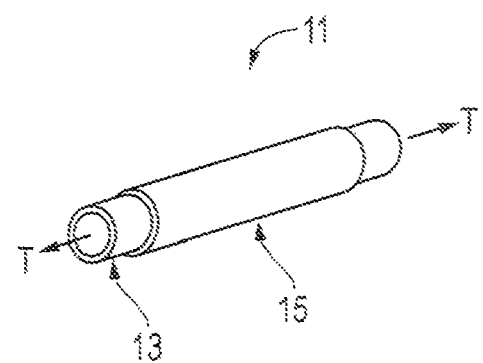
FIG. 1 is an isometric view of one embodiment of a pre-tensioned pipe constructed in accordance with the invention.

Referring to FIG. 1, one embodiment of an assembly 11 comprising a composite-wrapped pipe 13 is shown. The letter "T" represents tension being applied to the pipe section along a longitudinal axis thereof. Although the pipe is schematically illustrated without end connections, some applications of the pipe may be fitted with connectors or other means of joining pipe sections together along their axes. The pipe also includes a composite fiber-matrix material 15 that is overlaid on top of the pipe's outer diameter (OD).

Figure 2:
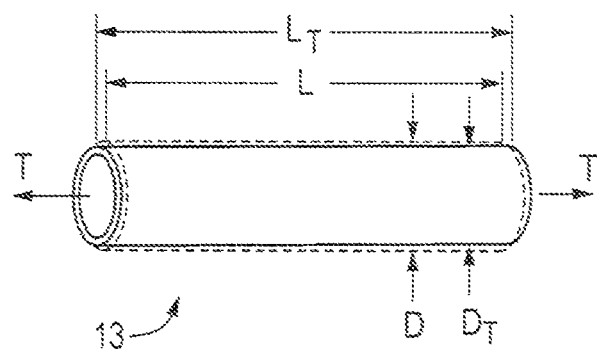
FIG. 2 is an isometric view of a pipe illustrating the effect of tension being applied thereto.

FIG. 2 illustrates the effects of applying axial tension T to pipe 13. As the pipe is placed in tension it stretches in the direction that the load T is applied. Because the volume of material cannot change, the pipe deflects inward for a reduction in diameter. This is known as Poisson's effect. Thus, when a pipe of original length L and diameter D is placed under axial tension T, the pipe expands to length $L_T$ and reduces in diameter to $D_T$, where $L_T>L$ and $D>D_T$. If the stress in the pipe is below yield strength, the pipe will elastically return to the original dimensions D and T when the tension is removed.

If the pipe 13 has a restriction (e.g., a composite covering 15 as shown in FIG. 1) placed on the OD while the pipe is under axial tension T, the covering 15 restricts the capability of the pipe to return to its original shape after the tension is removed. This restriction produces a pressure at the interface between the pipe 13 and the covering 15, which develops a tensile hoop stress in the covering 15 and a compressive hoop stress in the pipe 13. Relatively speaking, if the elastic modulus of the covering is much higher than the pipe, the stress will be higher, whereas if the elastic modulus of the covering is low compared to the pipe, the stress will be lower.

The magnitude of this pre-stress will determine how much load sharing will occur between the pipe and the covering. This value may be adjusted by, for example: (a) altering the elastic modulus of the pipe (e.g., using different materials of steel, titanium, etc.); (b) altering the elastic modulus of the composite fiber; and/or (c) altering the amount of initial pipe deflection through the magnitude of the tension.

The pre-stressing of the pipe places an unloaded pipe in hoop compression and axial tension. Conversely, the composite on the pipe is in hoop expansion and axial compression. Consequently, when the product is in service, internal pressure in the pipe is shared by the composite, such that a pipe with a relatively thinner wall may be used to take the same amount of internal pressure without yielding. Without the pre-stress applied by the composite wrap, thinner walled pipes would be in danger of yielding prior to the composite sharing enough of the load. In addition, a circumferential composite wrap is less likely to separate from the pipe when environmental tension is applied in service, depending on the magnitude of the pre-tension applied.

Figure 3A:
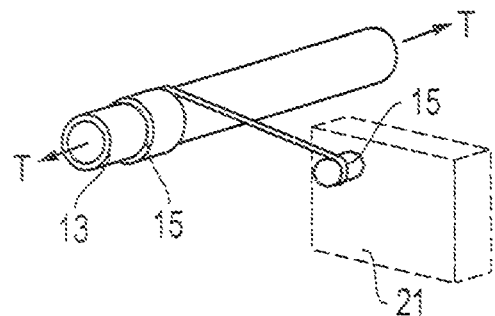
FIGS. 3A-3C are isometric views of another embodiment of a pre-tensioned pipe at initial, intermediate, and final phases of assembly and are constructed in accordance with the invention.
Figure 3B:
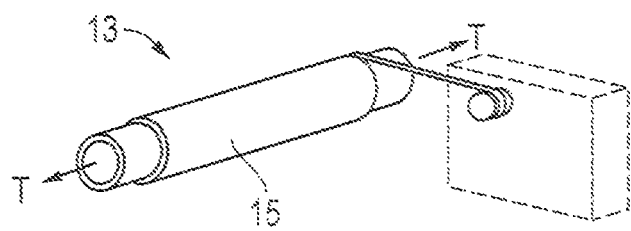
Figure 3C:
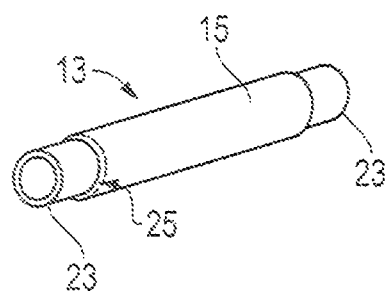

In one embodiment (FIGS. 3A-C), the invention comprises a method of forming a pipe assembly. A pipe 13 has an axis, an inner diameter and an outer diameter. A force, such as tension T, is applied to the pipe in the axial direction such that the outer diameter is reduced to a tension diameter. As shown in FIG. 3A, a covering 15 is applied to the outer diameter of the pipe, such as from a composite manufacturing/spooling machine 21. After the pipe 13 is wrapped as shown in FIG. 3B (e.g., except for connector portions 23), the covering may be cured by heat, UV radiation, etc. Thereafter, tension on the pipe is released (FIG. 3C) such that stress is developed at the interface 25 between the pipe and covering. The stress improves load sharing between the pipe and the covering when the inner diameter of the pipe is pressurized under operating conditions.

Figure 8:
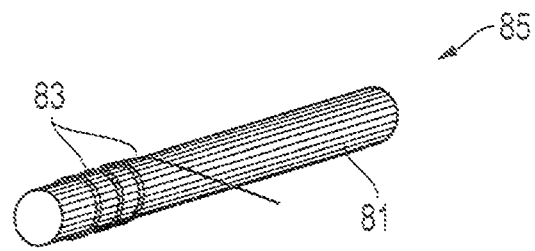
FIG. 8 is a schematic isometric view of another embodiment of pre-tensioning a pipe and is constructed in accordance with the invention.

The covering may comprise a composite that is circumferentially wrapped on the pipe from a spooling machine as shown in FIGS. 3A and 3B. For example, the covering may comprise carbon fibers, at least some of which are axially-oriented 81 (FIG. 8) and at least some of which are circumferentially-oriented 83 relative to the pipe 81. Alternatively, the covering may comprise bundles or a continuous, pre-manufactured fabric or tape (e.g., pre-pregnated tape).

Figure 4:
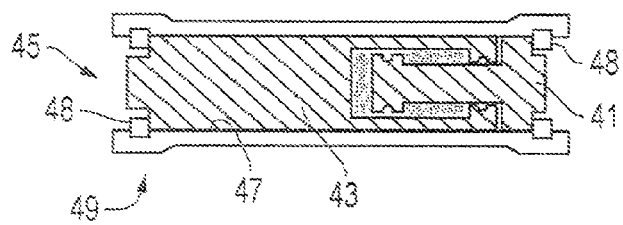
FIG. 4 is a sectional side view of a third embodiment of pre-tensioning a pipe and is constructed in accordance with the invention.

In other embodiments (FIGS. 4-5), tension may be applied to the pipe with one or more hydraulic devices. For example, as shown in FIG. 4, the piston 41 and cylinder 43 of a hydraulic device 45 may be located in the interior 47 of the pipe 49. End connections 48 may be welded to the pipe 49 and are formed with reaction features (e.g., shoulders) against which the hydraulic device 45 reacts.

Figure 5A:
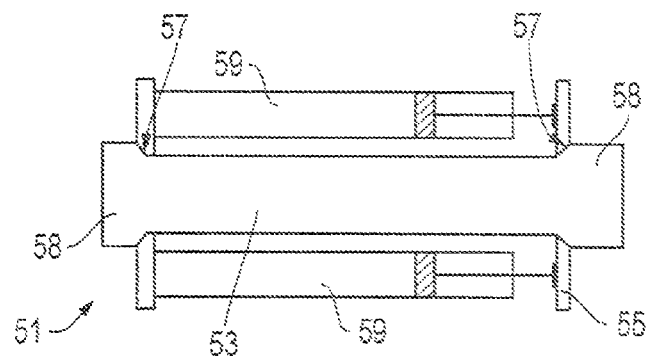
FIGS. 5A and 5B are sectional side and isometric views of a fourth embodiment of pre-tensioning a pipe and is constructed in accordance with the invention.
Figure 5B:
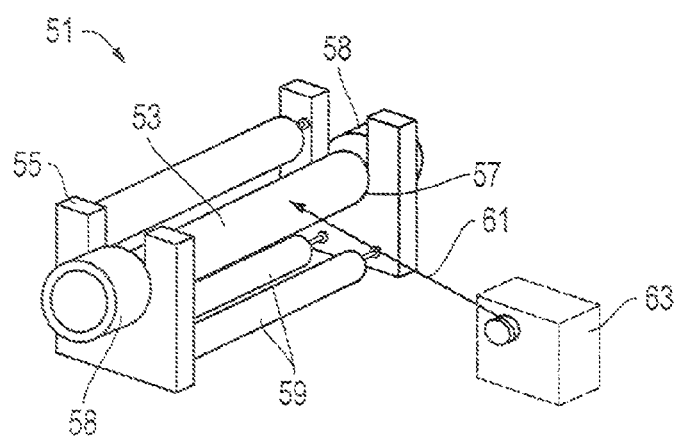

As shown in FIGS. 5A and 5B, a hydraulic device 51 is located external to the pipe 53. The pipe 53 is mounted in a tensioning frame 55 (e.g., with or without bearings 57) having at least one hydraulic device 59 for applying tension to the tensioning frame 55 which reacts against upset end pieces on the pipe end connections 58 to supply the tension. The pipe 53 may be rotated such that the covering 61 is wrapped from a stationary spool 63 that only rotates about an axis of the spool. Alternatively, the covering 61 may be moved around the pipe 53 while the pipe is stationary, or a combination of rotating the pipe and moving the spool about the rotating pipe.

Figure 6:
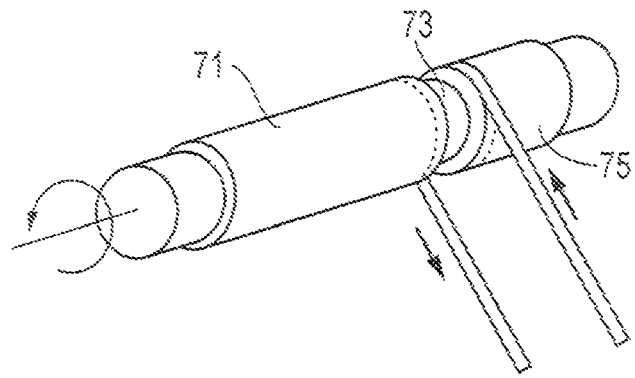
FIG. 6 is an isometric view of a fifth embodiment of pre-tensioning a pipe and is constructed in accordance with the invention.

Referring now to FIG. 6, a pre-cured composite 71 may be applied to the pipe 73 under tension to exert a compressive stress on the pipe 73. The pre-cured composite 71 is then unrolled from the pipe 73 while simultaneously applying an uncured composite 75 to the pipe 73 directly adjacent to the unrolling pre-cured composite 71, such that the uncured composite 75 takes advantage of the compressed condition of the pipe 73 beneath the pre-cured composite 71. After the uncured composite 75 has completely replaced the pre-cured composite 71, the uncured composite 75 is cured on the compressed pipe 73.

Figure 9:
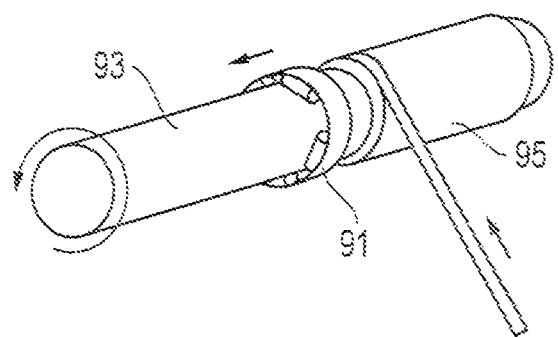
FIG. 9 is a schematic isometric view of still another embodiment of pre-tensioning a pipe and is constructed in accordance with the invention.

As shown in FIG. 9, another embodiment of the invention comprises applying another source of compressive stress on the pipe. The source of compressive stress on the pipe may comprise a roller assembly or a bearing assembly 91 for compressing the pipe 93. The assembly 91 is axially moved relative to the pipe while simultaneously applying the uncured composite 95 to the pipe directly adjacent to the moving assembly 91. In this way, the uncured composite 95 takes advantage of the compressed condition of the pipe beneath the assembly 91 as described above for FIG. 6.

Figure 7:
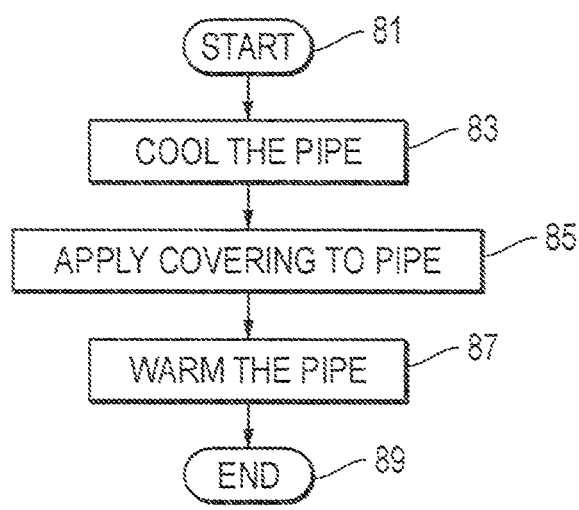
FIG. 7 is a high level flow diagram of a sixth embodiment of pre-tensioning a pipe and is constructed in accordance with the invention.

Another alternate embodiment is depicted in FIG. 7 as a high level flow diagram. The method begins as indicated at step 81, and comprises reducing a temperature of the pipe (step 83), wrapping the pipe in a covering (step 85), and then warming the pipe to an ambient temperature to provide an axial tension in the covering (step 87), before ending as indicated at step 89. The temperature of the pipe may be reduced by, for example, freezing the pipe in a chamber, supplying a cold fluid to the inner diameter of the pipe, etc. The covering may comprise a UV-cured epoxy that is cured with UV radiation prior to warming the pipe.

While the invention has been shown or described in only some of its forms, it should be apparent to those skilled in the art that it is not so limited, but is susceptible to various changes without departing from the scope of the invention.

What is claimed is:

1. A method of forming a pipe assembly, comprising:
   (a) providing a metal alloy pipe having an axis, an inner diameter and an outer diameter;
   (b) reducing a temperature of the pipe; then
   (c) while the pipe is at a reduced temperature, wrapping an uncured composite fiber around the outer diameter of the pipe; then
   (d) curing the composite fiber; and then
   (e) warming the pipe to an ambient temperature to provide compression to the pipe in response to the composite fiber being wrapped around the pipe.

2. The method according to claim 1, wherein the temperature of the pipe is reduced by freezing the pipe in a chamber.

3. The method according to claim 1, wherein the temperature of the pipe is reduced by providing a continuous supply of a cold fluid to the inner diameter of the pipe.

4. The method according to claim 1, wherein curing the composite fiber comprises applying UV radiation.

5. The method according to claim 1, wherein curing the composite fiber comprises applying UV radiation to the composite fiber while maintain the pipe at the reduced temperature.

6. A method of forming a pipe assembly, comprising:
   (a) providing a steel alloy pipe having an axis, an inner diameter and an outer diameter;
   (b) reducing a temperature of the pipe to cause the pipe to thermally contract; then
   (c) while the pipe is thermally contracted, wrapping an uncured composite fiber around the outer diameter of the pipe; then
   (d) applying UV radiation to the composite fiber while the pipe is still thermally contracted to cure the composite fiber; then
   (e) after the curing has been completed, warming the pipe to an ambient temperature, which causes the pipe to thermally expand relative to the composite fiber to provide compression to the pipe with the composite fiber.

7. The method according to claim 6, wherein reducing the temperature of the pipe is performed by providing a continuous supply of a cold fluid to the inner diameter of the pipe.

* * * * *

UNITED STATES PATENT AND TRADEMARK OFFICE
CERTIFICATE OF CORRECTION

PATENT NO. : 8,440,034 B2  
APPLICATION NO. : 13/036187  
DATED : May 14, 2013  
INVENTOR(S) : Pallini et al.

Page 1 of 1

It is certified that error appears in the above-identified patent and that said Letters Patent is hereby corrected as shown below:

In the Specification

In Column 4, Line 15, delete "FIG, 3A" and insert -- FIG. 3A --, therefor.

Signed and Sealed this
First Day of October, 2013

Teresa Stanek Rea
*Deputy Director of the United States Patent and Trademark Office*